United States Patent Office 3,637,879
Patented Jan. 25, 1972

3,637,879
HYDROGENATION OF AROMATIC HYDROCARBONS
John C. Hayes, Palatine, Ill., assignor to Universal Oil Products Company, Des Plaines, Ill.
No Drawing. Application July 7, 1969, Ser. No. 839,643, which is a continuation-in-part of application Ser. No. 828,762, May 28, 1969. Divided and this application Aug. 7, 1970, Ser. No. 62,179
Int. Cl. C07c 5/10
U.S. Cl. 260—667
7 Claims

ABSTRACT OF THE DISCLOSURE

A process for hydrogenating hydrocarbons and mixtures of hydrocarbons utilizing a catalytic composite of a porous carrier material, a Group VIII noble metal component and a germanium component. A specific example of one such process is the hydrogenation of benzene to produce cyclohexane.

RELATED APPLICATIONS

The present application is a division of my copending application, Ser. No. 839,643, filed July 7, 1969, which, in turn, is continuation-in-part of my copending application, Ser. No. 828,762 filed May 28, 1969, all the teachings of which copending applications are incorporated herein by specific reference thereto. This application is filed to comply with a requirement for restriction in Ser. No. 839,643.

APPLICABILITY OF INVENTION

The present invention encompasses the use of a catalytic composite of a porous carrier material, a Group VIII noble metal component and a germanium component in the hydroprocessing of hydrocarbons and mixtures of hydrocarbons, and involves the conversion of hydrocarbons at operating conditions selected to effect a chemical consumption of hydrogen. Included within the processes intended to be encompassed by the term "hydroprocessing" are hydrocracking, ring-opening, hydrorefining (for nitrogen removal and olefin saturation) and desulfurization (often included in hydrorefining). Specifically, the invention described herein is directed to the hydrogenation of aromatic hydrocarbons for the production of cycloparaffinic hydrocarbons.

The subject of the present invention is the use of a catalytic composite which has exceptional activity and resistance to deactivation when employed in a hydrogenation process. More specifically, the present process utilizes a dual-function catalytic composite which enables substantial improvements in those hydrogenation processes that have traditionally used a dual-funtcion catalyst. The particular catalytic composite constitutes a porous carrier material, a Group VIII noble metal component and a germanium component. More specifically, an improved aromatic hydrogenation process utilizes a substantially halogen-free composite of a platinum or palladium component, an alkalinous metal component and a germanium component for improved activity, product selectivity and operational stability characteristics.

Catalytic composites are used to promote a wide variety of hydrocarbon conversion reactions such as hydrocracking, isomerization, dehydrogenation, hydrogenation, desulfurization, reforming, ring-opening, cyclization, aromatization, alkylation and transalkylation, polymerization, cracking, etc., some of which reactions are hydrogen-producing while others are hydrogen-consuming. In using the term "hydrogen-consuming," I intend to exclude those processes wherein hydrogen consumption involves the saturation of light olefins, resulting from undesirable cracking, which produces the light paraffins, methane, ethane and propane. It is to one of the latter group of reactions, hydrogen-consuming, that the present invention is applicable.

Regardless of the reaction involved, or the particular process, it is important that the catalyst exhibit not only the capability to perform its specified functions initially, but also perform them satisfactorily for prolonged periods of time. The analytical terms employed in the art to measure how efficient a particular catalyst performs its intended functions in a particular hydrocarbon conversion process, are activity, selectivity and stability. For the purpose of discussion, these terms are conveniently defined herein as follows: (1) activity is a measure of the ability of the catalyst to convert a hydrocarbon feed stock into products at a specified severity level, where severity level alludes to the operating conditions employed—the temperature, pressure, liquid hourly space velocity and hydrogen concentration; (2) selectivity refers to the weight perecnt or volume percent of the reactants that are converted into the desired product and/or products; (3) stability connotes the rate of change of the activity and selectivity parameters with time—obviously, the smaller rate implying the more stable catalyst. With respect to a process for hydrogenating an aromatic hydrocarbon, for example benzene, activity, stability and selectivity are similarly defined. Thus, "activity" connotes the quantity of benzene charge stock which is converted. "Selectivity" refers to the quantity of converted charge stock which results in cyclohexane. "Stability" connotes the rate of change of activity and selectivity.

As is well known to those skilled in the art, the principal cause of observed deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions utilized result in the formation of high molecular weight, black, solid or semi-solid, hydrogen-poor carbonaceous material which coats the surface of the catalyst and reduces its activity by shielding its active sites from the reactants. Accordingly, a major problem facing workers in this area is the development of more active and selective catalytic composites that are not as sensitive to the presence of these carbonaceous materials and/or have the capability to suppress the rate of formation of these materials at the operating conditions employed in a particular process.

I have now found a dual-function catalytic composite which possesses improved activity, selectivity and stability when employed in the hydroprocessing of hydrocarbons, wherein there is effected a chemical consumption of hydrogen. In particular, I have found that the use of a catalytic composite of a Group VIII noble metal component and a germanium component with a porous carrier material improves the overall operation of a process for the hydrogenation of aromatic hydrocarbons. As indicated, the present invention essentially involves the use of a catalyst in which a germanium component has been added to a dual-function conversion catalyst, and enables the performance characteristics of the process to be sharply and materially improved. An essential condition associated with the aquisition of this improved performance is the oxidation state of the germanium component utilized in this catalyst. As a result of my investigations, I have determined that the germanium component must be utilized in a positive oxidation state (i.e., either +2 or +4) and that the germanium component must be uniformly distributed throughout the porous carrier material. Furthermore, the catalyst must be prepared under carefully controlled conditions. In short, the present invention essentially involves the finding that the addition of a controlled amount of a germanium component, in a positive oxidation state, to a dual-function hydrocarbon conversion catalyst containing a Group VIII noble metal component enables performance characteristics of the catalyst to be sharply and materially improved when used in a process for hydrogenating aromatic hydrocarbons.

OBJECTS AND EMBODIMENTS

An object of the present invention is to afford a process for the hydroprocessing of a hydrocarbon, or mixtures of hydrocarbons. A corollary objective is to improve the selectivity and stability of an aromatic hydrogenation process utilizing a highly active, germanium component-containing catalytic composite.

Therefore, in one embodiment, my invention involves a process for producing a cycloparaffinic hydrocarbon which comprises contacting hydrogen and an aromatic hydrocarbon in a reaction zone, in contact with a catalytic composite of a Group VIII noble metal component, a germanium component, an alkalinous metal component and a porous carrier material, separating the resulting reaction zone effluent to recover said cycloparaffinic hydrocarbon. In another embodiment, the operating conditions include a pressure of from 500 to about 2,000 p.s.i.g., an LHSV (defined as volumes of liquid hydrocarbon charge per hour per volume of catalyst disposed in the reaction zone) of from 1.0 to about 10.0 and a maximum catalyst temperature of form 200° F. to about 800° F.

Other objects and embodiments of my invention relate to additional details regarding preferred catalytic ingredients, the concentration of components in the catalytic composite, methods of catalyst preparation, preferred processing techniques and the like particulars which are hereinafter given in the following, more detailed summary of my invention.

SUMMARY OF INVENTION

As hereinabove set forth, the present invention involves the hydroprocessing of hydrocarbons and mixtures of hydrocarbons, utilizing a particular catalytic composite. This catalyst comprises a porous carrier material having combined therewith a Group VIII noble metal component and a germanium component; in many applications, the catalytic will also contain a halogen component, and in some select applications, an alkali metal or alkaline-earth metal component. Considering first the porous carrier material, it is preferred that it be a porous, adsorptive, high-surface area support having a surface area of about 25 to about 500 square meters per gram. In particular, porous carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, the preferred carrier material is substantially non-acidic alumina.

As hereinabove set forth, the porous carrier material, for use in the process of the present invention, is a refractory inorganic oxide, either alumina in and of itself, or in combination with one or more other refractory inorganic oxides. When utilized as the sole component of the carrier material, the alumina may be of the gamma-, eta-, or theta-alumina type, with gamma-, or eta-alumina giving the best results. In addition, preferred carrier materials have an apparent bulk density of about 0.30 to about 0.70 gm./cc. and surface area characteristics such that the average pore diameter is about 20 to about 300 angstroms, the pore volume is about 0.10 to about 1.0 milliliter per gram and the surface area is about 100 to about 500 square meters per gram. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina. The carrier material may be formed in any desired shape such as spheres, pills, cakes, extrudates, powders, granules, etc., and may further be utilized in any desired size.

One essential constituent of the catalyst of the present invention is a germanium component, and it is an essential feature that the germanium component is present in the composite in an oxidation state above that of the elemental metal. That is to say, the germanium component necessarily exists within the catalytic composite in either the +2 or +4 oxidation state, the latter being the most likely state. Accordingly, the germanium component will be present in the composite as a chemical compound, such as the oxide, sulfide, halide, etc., wherein the germanium is in the required oxidation state, or in a chemical combination with the carrier material in which combination the germanium exists in this higher oxidation state. On the basis of the evidence currently available, it is believed that the germanium component in the subject composite exists as germanous or germanic oxide. It is important to note that this limitation on the state of the germanium component requires extreme care in the preparation and use of the subject composite in order to insure that it is not subjected to high temperature reduction conditions (reduction at temperatures above 1000° F.) effective to produce the germanium metal. This germanium component may be incorporated in the catalytic composite in any suitable manner known to the art such as by co-precipitation or cogellation with the porous carrier material, ion-exchange with the gelled carrier material or impregnation with the carrier material either after or before it is dried and calcined. It is to be noted that it is intended to include within the scope of the present invention all conventional methods for incorporating a metallic component in a catalytic composite and the particular method of incorporation used is not deemed to be an essential feature of the present invention. One method of incorporating the germanium component into the catalytic composite involves co-precipitating the germanium component during the preparation of the carrier material. This method typically involves the addition of a suitable soluble germanium compound such as germanium tetrachloride to the inorganic oxide hydrosol and then combining the hydrosol with a suitable gelling agent and dropping the resultant mixture into an oil bath maintained at elevated temperatures. The droplets remain in the oil bath until they set and form hydrogel spheres. The spheres are withdrawn from the oil bath and subjected to specific aging treatments in oil and in an ammoniacal solution. The aged spheres are washed and dried at a temperature of about 200° F. to 400° F., and thereafter calcined at an elevated temperature of about 850° F. to about 1300° F. Further details of spherical particle production may be found in U.S. Pat. 2,620,314, issued to James Hoekstra. After drying and calcining the resulting gelled carrier material, there is obtained an intimate combination of alumina and germanium oxide. A preferred method of incorporating the germanium component into the catalytic composite involves utilization of a soluble, decomposable compound of germanium to impregnate the porous carrier material. In general, the solvent used in this impregnation step is selected on the basis of the capability to dissolve the desired germanium compound and is preferably an aqueous, or alcoholic solution. Thus, the germanium component may be added to the carrier material by commingling the latter with a solution of a suitable germanium salt or suitable compound of germanium such as germanium tetrachloride, germanium difluoride, germanium tetrafluoride, germanium di-iodide, germanium monosulfide, and the like compounds. In general, the germanium component can be impregnated either prior to, simultaneously with, or after the Group VIII noble metal component is added to the carrier material. However, I have found that excellent results are obtained when the germanium component is impregnated simultaneously with the Group VIII noble metal component. In fact, I have determined that a preferred impregnation solution contains chloroplatinic acid, hydrogen chloride, and germanous oxide dissolved in chlorine water, especially when the catalyst is intended to contain combined chloride.

Regardless of which germanium compound is used in the preferred impregnation step, it is important that the germanium component be uniformly distributed throughout the carrier material. It is preferred to use a volume ratio of impregnation solution to carrier material of at least 1.5:1 and preferably about 2:1 to about 10:1, or more. Similarly, it is preferred to use a relatively long contact time during the impregnation step ranging from about ¼ hour up to about ½ hour or more before drying to remove excess solvent in order to insure a high dispersion of the germanium component on the carrier material. The carrier material is, likewise, preferably constantly agitated during this preferred impregnation step.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridium. The Group VIII noble metal component, for example platinum, may exist within the final catalytic composite as a compound such as an oxide, sulfide, halide, etc., or in an elemental state. The Group VIII noble metal component generally comprises about 0.01% to about 2.0% by weight of the final composite, calculated on an elemental basis. Excellent results are obtained when the catalyst contains about 0.3% to about 0.9% by weight of the Group VIII noble metal. In addition to platinum, another particularly preferred Group VIII noble metal component is palladium, or a compound of palladium.

The Group VII noble metal component may be incorporated within the catalytic composite in any suitable manner including co-precipitation or cogellation with the carrier material, ion-exchange, or impregnation. A preferred method of preparation involves the utilization of a water-soluble compound of a Group VIII noble metal component in an impregnation technique. Thus, a platinum component may be added to the carrier material by commingling the latter with an aqueous solution of chloroplatinic acid. Other water-soluble compounds of platinum may be employed, and include ammonium chloroplatinate, platinum chloride, dinitro diamino platinum, etc. In addition, it is generally preferred to impregnate the carrier material after it has been calcined in order to minimize the risk of washing away the valuable Group VIII noble metal compounds; however, in some instances it may prove advantageous to impregnate the carrier material when it exists in a gelled state. Following impregnation, the composite will generally be dried at a temperature of about 200° F. to about 400° F., for a period of from 2 to about 24 hours, or more, and finally calcined at a temperature of about 700° F. to 100° F., in an atmosphere of air, for a period of about 0.5 to about 10 hours.

Although not essential to successful hydroprocessing in all cases, in fact detrimental to aromatic hydrogenation, a halogen component may be incorporated into the catalytic composite. Although the precise form of the chemistry of the association of the halogen component with the carrier material and metallic components is not accurately known, it is customary in the art to refer to the halogen component as being combined with the carrier material, or with the other ingredients of the catalyst. The combined halogen may be either fluorine, chlorine, iodine, bromine, or mixtures thereof. The halogen may be added to the carrier material in any suitable manner, and either during preparation of the carrier or before, or after the addition of the other components. For example, the halogen may be added at any stage in the preparation of the carrier material, or to the calcined carrier material, as an aqueous solution of an acid such as hydrogen fluoride, hydrogen chloride, hydrogen bromide, hydrogen iodide, etc. The halogen component or a portion thereof may be composited with the carrier material during the impregnation of the latter with the Group VIII noble metal component. The inorganic oxide hydrosol, which is typically utilized to form an amorphous carrier material, may contain halogen and thus contribute at least a portion of the halogen component to the final composite. The quantity of halogen is such that the final catalytic composite contains about 0.1% to about 1.5% by weight, and preferably from about 0.5% to about 1.2%, calculated on an elemental basis.

With respect to the quantity of the germanium component, it is preferably about 0.01% to about 5.0% by weight, calculated on an elemental basis. Regardless of the absolute quantities of the germanium component and the platinum group component, the atomic ratio of the Group VIII noble metal to the germanium contained in the catalyst is preferably selected from the range of about 0.1:1 to about 3:1, with excellent results being achieved at an atomic ratio of about 0.5:1 to about 1.5:1. This has been found to be particularly true when the total content of the germanium component plus the Group VIII noble metal component is fixed in the range of about 0.15 to about 3.0% by weight. Accordingly, examples of suitable catalytic composites, considering only the Group VIII noble metal component and the germanium component are as follows: 0.5% by weight of germanium, 0.75% by weight of platinum; 0.1% by weight of germanium, 0.65% by weight of platinum; 0.375% by weight of germanium, 0.375% by weight of platinum; 1.0% by weight of germanium, 0.5% by weight of platinum; 0.25% by weight of germanium; 0.5% by weight of platinum; 0.75% by weight of palladium, 0.5% by weight of germanium; 0.65% by weight of palladium, 0.1% by weight of germanium; 0.375% by weight of palladium, 0.375% by weight of germanium; 0.5% by weight of palladium, 1.0% by weight of germanium; and 0.5% by weight of palladium, 0.25% by weight of germanium. In those processes wherein the acid function of the catalytic composite must necessarily be attenuated, as in aromatic hydrogenation, the metallic components will be combined with a carrier material consisting essentially of alumina. In this latter situation, a halogen component is often not combined with the catalytic composite, and, the inherent acid function of Group VIII noble metals and the alumina is further attentuated through the addition of from 0.01% to about 1.5% by weight of an alkalinous metal component.

One such process, in which the acid function of the catalyst employed must necessarily be attenuated, is the process wherein an aromatic hydrocarbon is hydrogenated to produce the corresponding cycloparaffin. Specifically, a benzene-concentrate is often used as the starting material for the production of cyclohexaneprimarily to satify the demand therefor in the manufacture of nylon. In order to avoid ring-opening which results in loss of both the benzene and the cyclohexane product, an alkalinous metal component is combined with the catalytic composite in an amount of from 0.01% to about 1.5% by weight. This component is selected from the group of lithium, sodium, potassium, rubidium, cesium, barium, strontium, calcium magnesium, beryllium, mixtures of two or more, etc. In general, more advantageous results are achieved through the use of the alkali metals, particularly lithium and/or potassium.

Prior to its use, in the hydroprocessing of hydrocarbons, the resultant calcined catalytic composite may be subjected to a substantially water-free reduction technique. This technique is designed to insure a uniform and finely-divided dispersion of the metallic components throughout the carrier material. Preferably, substantially pure and dry hydrogen (i.e. less than about 30.0 vol. p.p.m. of water) is employed as the reducing agent. The calcined catalyst is contacted at a temperature of about 800° F. to about 1000° F., and for a period of time of about 0.5 to about 2 hours, in order to minimize the risk of reducing the germanium component, but effected to substantially reduce the Group VIII noble metal component. This reduction technique may be performed in situ as part of a start-up sequence provided precautions are observed to predry the unit to a substantially water-free state.

Again, with respect to effecting hydrogen-consuming reactions, the process is generally improved when the reduced composite is subjected to a presulfiding operation designed to incorporate from about 0.05 to about 0.50% by weight of sulfur, on an elemental basis, in the catalytic composite. This presulfiding treatment takes place in the presence of hydrogen and a suitable sulfur-containing compound including hydrogen sulfide, lower molecular weight mercaptans, organic sulfides, etc. The procedure constitutes treating the reduced catalyst with a sulfiding gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. up to about 1000° F.

According to the present invention, the hydrocarbon charge stock and hydrogen are contacted with a catalyst of the type described above in a hydrocarbon conversion zone. The contacting may be accomplished by using the catalyst in a fixed-bed system, a moving-bed system, a fluidized-bed system, or in a batch-type operation; however, in view of the risk of attrition losses of the valuable catalyst, it is preferred to use the fixed-bed system. Furthermore, it is well known that a fixed-bed catalytic system offers many operational advantages. In this type of system, a hydrogen-rich gas and the charge stock are preheated by any suitable heating means to the desired temperature, and then are passed into a conversion zone containing the fixed-bed of the catalytic composite. It is understood, of course, that the conversion zone may be one or more separate reactors having suitable means therebetween to insure that the desired conversion temperature is maintained at the entrance to each reactor. It is also to be noted that the reactants may be contacted with the catalyst bed in either upward, downward, or radial flow fashion, with the latter being preferred. Additionally, the reactants may be in the liquid phase, a mixed liquid-vapor phase, or a vapor phase when they contact the catalyst.

In view of the fact that the reactions being effected are exothermic in nature, an increasing temperature gradient is experienced as the hydrogen and feed stock traverse the catalyst bed. For any given hydrogen-consuming process, it is desirable to maintain the maximum catalyst bed temperature below about 900° F., which temperature is virtually identical to that conveniently measured at the outlet of the reaction zone. In order to assure that the catalyst bed temperature does not exceed the maximum allowed for a given process, the use of conventional quench streams, either normally liquid or gaseous, introduced at one or more intermediate loci of the catalyst bed, may be utilized. In some of the hydrocarbon hydroprocesses, especially where hydrocracking a heavy hydrocarbonaceous material to produce lower-boiling hydrocarbon products, that portion of the normally liquid product effluent boiling above the end point of the desired product will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other details will be given in the following detailed description. These will be presented by way of an example given in conjunction with a commercially-scaled operating unit. It is not intended that the invention be limited to the specific illustration, nor is it intended that the process be limited to the particular operating conditions, catalytic composite, processing techniques, charge stock, etc. It is understood, therefore, that the present invention is merely illustrated by the specifics hereinafter set forth.

EXAMPLE

The present invention is illustrated as applied to the hydrogenation of aromatic hydrocarbons such as benzene, toluene, the various xylenes, naphthalenes, etc., to form the corresponding cyclic paraffins. When applied to the hydrogenation of aromatic hydrocarbons, which are contaminated by sulfurous compounds, primarily thiophenic compounds, the process is advantageous in that it affords 100.0% conversion without the necessity for the substantially complete prior removal of the sulfur compounds. The corresponding cyclic paraffins, resulting from the hydrogenation of the aromatic nuclei, include compounds such as cyclohexane, mono-, di-, tri-substituted cyclohexanes, decahydronaphthalene, tetrahydronaphthalene, etc., which find widespread use in a variety of commercial industries in the manufacture of nylon, as solvents for various fats, oils, waxes, etc.

Aromatic concentrates are obtained by a multiplicity of techniques. For example, a benzene-containing fraction may be subjected to distillation to provide a heart-cut which contains the benzene. This is then subjected to a solvent extraction process which separates the benzene from the normal or iso-paraffinic components, and the naphthenes contained therein. Benzene is readily recovered from the selected solvent by way of distillation, and in a purity of 99.0% or more. Heretofore, the hydrogenation of aromatic hydrocarbons, for example benzene, has been effected with a nickel-containing catalyst. This is extremely disadvantageous in many respects, and especially from the standpoint that nickel is quite sensitive to the minor quantity of sulfurous compounds which may be contained in the benzene concentrate. In accordance with the present process, the benzene is hydrogenated in contact with a non-acidic catalytic composite containing 0.01% to about 2.0% by weight of a Group VIII noble metal component, from about 0.01% to about 5.0% by weight of a germanium component and from about 0.01% to about 1.5% by weight of an alkalinous metal component. Operating conditions include a maximum catalyst bed temperature in the range of about 200° F. to about 800° F., a pressure of from 500 to about 2,000 p.s.i.g., a liquid hourly space velocity of about 1.0 to about 10.0 and a hydrogen concentration in an amount sufficient to yield a mole ratio of hydrogen to cyclohexane, in the product effluent, not substantially less than about 4.0:1. Although not essential, one preferred operating technique involves the use of three reaction zones, each of which contains approximately one-third of the total quantity of catalyst employed. The process is further facilitated when the total fresh benzene is added in three approximately equal portions, one each to the inlet of each of the three reaction zones.

The catalyst utilized is a substantially halogen-free alumina carrier material combined to about 0.50% by weight of germanium, 0.375% by weight of platinum, and about 0.90% by weight of lithium, all of which are calculated on the basis of the elemental metals. The hydrogenation process will be described in connection with a commercially-scaled unit having a total fresh benzene feed capacity of about 1,488 barrels per day. Make-up gas in an amount of about 741.6 mols/hr. is admixed with 2,396 bbl./day (about 329 mols/hr.) of a cyclohexane recycle stream, the mixture being at a temperature of about 137° F., and further mixed with 96.24 mols/hr. (582 bbl./day) of the benzene feed; the final mixture constitutes the total charge to the first reaction zone.

Following suitable heat-exchange with various hot effluent streams, the total feed to the first reaction zone is at a temperature of 385° F. and a pressure of 460 p.s.i.g. The reaction zone effluent is at a temperature of 606° F. and a pressure of about 450 p.s.i.g. The total effluent from the first reaction zone is utilized as a heat-exchange medium, in a stream generator, whereby the temperature is reduced to a level of about 545° F. The cooled effluent is admixed with about 98.5 moles per hour (596 bbl./day) of fresh benzene feed, at a temperature of 100° F.; the resulting temperature is 400° F., and the mixture enters the second reaction zone at a pressure of about 440 p.s.i.g. The second reaction zone effluent, at a pressure of 425 p.s.i.g. and a temperature of 611° F., is admixed with 51.21 mols/hr. (310 bbl./day) of fresh benzene feed, the resulting mixture being at a temperature of 578° F. Following its use as a heat-exchange medium, the temperature is reduced to 400° F., and the mixture enters the third reaction zone at a pressure of 415 p.s.i.g. The third reaction zone effluent is at a temperature of about 509° F. and a pressure of about 400 p.s.i.g. Through utilization as a heat-exchange medium, the temperature is reduced to a level of about 244° F., and subsequently reduced to a level of about 115° F. by use of an air-cooled condenser. The cooled third reaction zone effluent is introduced into a high pressure separator, at a pressure of about 370 p.s.i.g.

A hydrogen-rich vaporous phase is withdrawn from the high pressure separator and recycled by way of compressive means, at a pressure of about 475 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at an operating pressure of about 250 p.s.i.g., a top temperature of about 160° F. and a bottom temperature of about 430° F. The cyclohexane product is withdrawn from the stabilizer as a bottom stream, the overhead stream being vented to fuel. The cyclohexane concentrate is recovered in an amount of about 245.80 moles per hour of which only about 0.60 mole per hour constitutes other hexanes. In brief summation, of the 19,207 pounds per hour of fresh benzene feed, 20,685 pounds per hour of cyclohexane product is recovered.

The foregoing specification, and particularly the example, indicates the method by which the present invention is effected, and the benefits afforded through the utilization thereof.

I claim as my invention:

1. A process for producing a cycloparaffinic hydrocarbon which comprises contacting hydrogen and an aromatic hydrocarbon in a reaction zone, in contact with a catalytic composite containing 0.01% to about 2.0% by weight of a Group VIII noble metal component, from about 0.01% to about 5.0% by weight of a germanium component, from about 0.01% to about 1.5% by weight of an alkalinous metal component and a porous carrier material, separating the resulting reaction zone effluent to recover said cycloparaffinic hydrocarbon.

2. The process of claim 1 further characterized in that said aromatic hydrocarbon is benzene.

3. The process of claim 1 further characterized in that said aromatic hydrocarbon is toluene.

4. The process of claim 1 further characterized in that said aromatic hydrocarbon is a xylene.

5. The process of claim 1 further characterized in that said aromatic hydrocarbon is a naphthalene.

6. The process of claim 1 further characterized in that said alkalinous metal component is a lithium or potassium component.

7. The process of claim 1 further characterized in that said Group VIII noble metal component is a platinum or palladium component.

References Cited

UNITED STATES PATENTS

| | | | |
|---|---|---|---|
| 3,098,030 | 7/1963 | Coonradt | 208—111 |
| 3,431,218 | 3/1969 | Flank et al. | 252—455 Z |
| 3,228,889 | 1/1966 | Garwood | 252—428 |
| 2,906,700 | 9/1959 | Stine | 208—138 |
| 2,906,701 | 9/1959 | Stine | 208—138 |

DELBERT E. GANTZ, Primary Examiner

V. O'KEEFE, Assistant Examiner

U.S. Cl. X.R.

208—143